United States Patent [19]
Burckhardt et al.

[11] Patent Number: 5,240,312
[45] Date of Patent: Aug. 31, 1993

[54] PROCESS AND SYSTEM FOR ANTI-LOCK CONTROL

[75] Inventors: Manfred Burckhardt, Waiblingen; Richard Zimmer, Fellbach; Armin Müller, Backnang, all of Fed. Rep. of Germany

[73] Assignee: Mercedes-Benz AG, Fed. Rep. of Germany

[21] Appl. No.: 2,548

[22] Filed: Jan. 11, 1993

Related U.S. Application Data

[63] Continuation of Ser. No. 604,630, Oct. 29, 1990, abandoned.

[30] Foreign Application Priority Data

Oct. 27, 1989 [DE] Fed. Rep. of Germany ....... 3935834

[51] Int. Cl.$^5$ .............................. B60T 8/02; B60T 8/18
[52] U.S. Cl. ..................................... 303/100; 303/22.1
[58] Field of Search .................... 303/22.1, 100, 113.1, 303/107, 113.5; 364/426.2

[56] References Cited

U.S. PATENT DOCUMENTS

| | | | |
|---|---|---|---|
| 4,093,316 | 9/1978 | Reinecke | 303/100 |
| 4,418,966 | 12/1983 | Hattwig | 303/100 |
| 4,795,219 | 1/1989 | Brearley et al. | 303/100 X |
| 4,863,221 | 9/1989 | McNinch, Jr. | 303/100 X |

FOREIGN PATENT DOCUMENTS 6925179 6/1979 Fed. Rep. of Germany .

OTHER PUBLICATIONS

"Berechnung und Rekonstruktion des Bremsverhaltens von PKW" Burchhardt et al, Verlag Information Ambs GmbH pp. 53-82.

Primary Examiner—Matthew C. Graham
Attorney, Agent, or Firm—Evenson, McKeown, Edwards & Lenahan

[57] ABSTRACT

A process for anti-lock control on a racing vehicle having an aerodynamic design which results, at high speeds, in a clear increase both of the front-axle load and the rear-axle load of the vehicle. On a wheel requiring control, the response of the anti-lock control is triggered in the direction of a brake-pressure reduction when an axle-related reference quantity $K_h$ or $K_v$, formed as a sum of weighted amounts of the wheel-circumference deceleration Z and of the brake slip of the respective vehicle wheel related to a reference speed, exceeds a threshold value. At least during the formation of the reference quantity critical for the front axle, the reciprocal value of the locking limit, determined with inclusion of negative lift forces and air resistance, of the vehicle wheels, plus a safety value $\Delta Z_o$, is taken as a weighting factor $X_v$. Within the framework of an anti-lock system suitable for carrying out the process, a brake unit switchable to different values of the brake-force distribution under the control of its electronic control unit is provided.

4 Claims, 2 Drawing Sheets

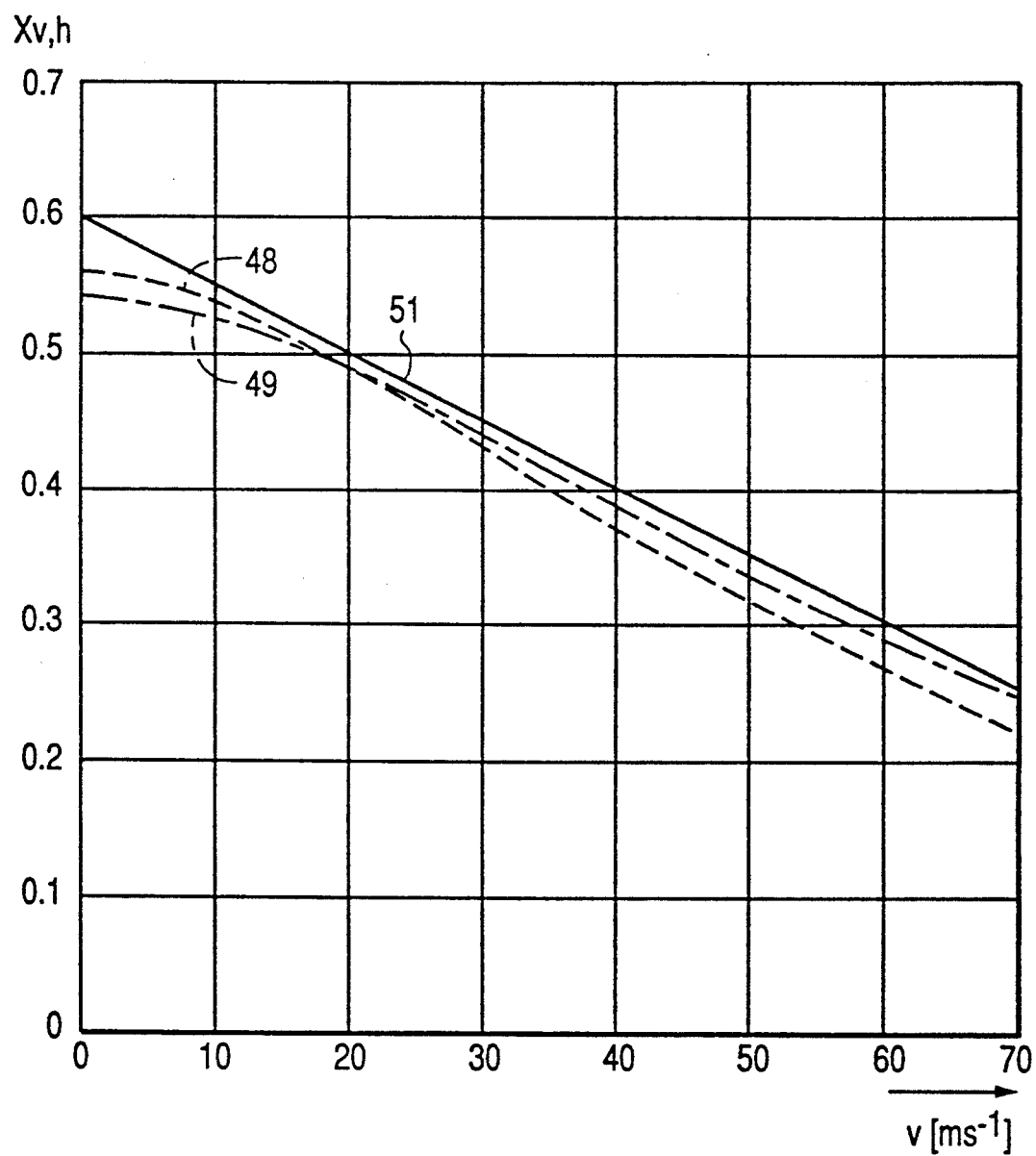

PROCESS AND SYSTEM FOR ANTI-LOCK CONTROL

This is a continuation of application Ser. No. 07/604,630, filed Oct. 29, 1990, now abandoned.

BACKGROUND AND SUMMARY OF THE INVENTION

The present invention relates to a system and process for anti-lock control which allow controlled braking with high vehicle deceleration even at maximum vehicle speeds.

In the known anti-lock system, brake-pressure reduction phases are triggered on the wheel brake of a vehicle wheel tending to lock when a sum $X_{v,h} \cdot Z_{v,h} + Y \cdot \lambda_{v,h}$ of amounts, weighted with the weighting factors $X_v$ and $X_h$, of the wheel-circumference deceleration $Z_v$ and $Z_h$ and of the brake slip $\lambda$ of the respective vehicle wheel, related to a reference speed, exceeds a response threshold value standardized for practical reasons at 1; that is to say, the weighting factors $X_{v,h}$ and Y are determined in such a way that, should the control respond solely as a result of an increased brake slip, without the wheel experiencing any appreciable deceleration, or should the wheel decelerate to an extent corresponding to the locking limit, without there being any appreciable brake slip, the product $Y \cdot \lambda_{v,h}$ or the product $X_{v,h} \cdot Z_{v,h}$ each has the value 1.

In the anti-lock systems corresponding to that of the German Utility Model G 69 25 179.2 and in developments of this system, the weighting factors $X_{v,h}$ and Y are predetermined as vehicle-specific constant quantities, as a result of the mutual coordination of which a dynamically stable braking behavior is achieved, a safety value $\Delta Z_o$ of a typical amount of 0.3 also being added to the said sum, so that the control commences on the wheel entering an increased deceleration and/or brake slip, before the locking limit is reached.

On production vehicles attaining maximum speeds of around 200 km/h and having an approximately speed-neutral aerodynamic behavior, this method of generating the reference quantity is perfectly suitable, even at maximum vehicle speeds, for obtaining in the anti-lock control mode the highest possible vehicle decelerations in relation to the road conditions and tire quality. It is unsuitable, however, for racing vehicles equipped with aerodynamic aids which at high vehicle speeds, which in the case of a racing vehicle may be up to 350 km/h and more, bring about drastic increases in the axle loads which also have a varying effect on the front axle and the rear axle, the aerodynamic speed-dependent axle-load increase on a modern racing vehicle reaching on the rear axle approximately double the value of that on the front axle.

It has been shown that racing vehicles equipped for test purposes, with an anti-lock system of the above-mentioned type, even when there were brake-pressure distribution controls working as a function of the axle load and therefore allowing a load-related front-axle/rear-axle brake-force distribution, achieved clearly poorer vehicle decelerations than racing vehicles of corresponding design, but without an anti-lock system.

The object of the present invention is, therefore, to improve a process for anti-lock control, to the effect that it allows controlled brakings with high vehicle decelerations, even at maximum vehicle speeds, and to provide an anti-lock system suitable for carrying out that process.

This object has been achieved, where the process is concerned, by reduction of the weighting factors, as a function of vehicle speed v, according to a relation $$X = X_o - b \cdot v,$$

under the secondary conditions that $$X \geq \max(X_v, X_h) \text{ and}$$

$$\int_0^{V_{max}} (X - \max(X_v m X_h)) \, d_v = \min,$$

$Z_{maxv}$ and $Z_{maxh}$ satisfying the conditions $$Z_{maxv} = Z_{blv} \frac{\mu_v \cdot K_{VA} \cdot V^2}{(1 + \mu_H \cdot \chi - \phi) \cdot G} + \frac{K_w \cdot V^2}{G}$$

$$Z_{maxh} = Z_{bln} \frac{\mu_H \cdot K_{HA} \cdot V^2}{(\mu_H \cdot \chi + \phi) \cdot G} + \frac{K_w \cdot V^2}{G}$$

in which the quantities $Z_{blv}$ and $Z_{blh}$ are formed by the respective relations $$Z_{blv} = \frac{\mu_v \cdot (1 - \psi)}{1 - \mu_v \cdot \chi - \phi} \text{ and } Z_{blh} = \frac{\mu_H \cdot \psi}{\mu_H \cdot \chi + \phi}$$

in which $\mu_v$ designates the adhesion coefficient on the front axle $\mu_h$ the adhesion coefficient on the rear-axle the rear-axle load fraction $\chi$ the height of the center of gravity related to the wheel base $\phi$ the rear-axle brake-force fraction related to the vehicle weight $K_{VA}$ the lift (negative lift) coefficient on the front axle $K_{HA}$ the lift (negative lift) coefficient on the rear axle $K_w$ the coefficient of air resistance, and G the vehicle weight (N).

The method according to the present invention forms the weighting factor X, unitary for the front axle and the rear axle, the consequence of which is a weighing of the wheel-circumference deceleration decreasing with an increasing vehicle speed, in the formation of the reference quantities $K_v$ and $K_h$ to be put in relation to the response threshold of the anti-lock control. This method achieves the result that the control responds when the vehicle wheel subjected to the control reaches at least approximately its best possible deceleration for brake-force transmission under the particular boundary conditions, that is to say achieves a control behavior which, with a stable braking behavior of the vehicle, nevertheless allows the highest possible vehicle decelerations to be utilized according to circumstances, this being considered a great advantage.

The formation of the weighing factor X, corresponding to a linear function of the speed, is highly suitable for a rapid on-line processing of the speed information data and allows a quick reaction of the ABS, this being especially important in racing.

In terms of an anti-lock system for carrying out the process according to the invention, the objects are achieved by an anti-lock system which, as regards its basic design, has an electronic control unit of the anti-lock system which comprises a speed comparator which, when a speed threshold value is exceeded, generates an output signal causing the switch to the brake-force distribution with the higher rear-axle brake-force traction, and a comparator which compares the reference quantity $K_h$ with the response threshold value and which, as soon as the reference quantity $K_h$ reaches the reference value and the control responds in the direction of pressure reduction phase, switches the brake system back to the brake-force distribution linked to the lower rear-axle brake-force fraction.

Another object is that the anti-lock system can be produced especially simply particularly in combination with a brake system with a switchable brake-force distribution.

The relevant switchability of the brake system can be obtained by designing the rear wheel brakes as 4-cylinder brakes, with a pair of cylinders of one wheel brake being combined respectively with a pair of cylinders of the other wheel brake to form a part brake circuit of the rear-axle brake circuit. One of the two part brake circuits is shut off from the brake unit below the threshold value $v_s$ by a value which is moved into its open position by the output signal of the speed comparator. Alternatively, a known master cylinder, with a switchable brake-pressure distributor, can be provided for switching the brake-force distribution.

BRIEF DESCRIPTION OF THE DRAWINGS

These and further objects, features and advantages of the present invention will become more apparent from the following detailed description of a presently preferred embodiment of the present invention when taken in conjunction with the accompanying drawings wherein:

FIG. 2 is a graph which explains the functioning of the anti-lock system according to FIG. 1 and a special method of carrying out the control process.

DETAILED DESCRIPTION OF THE DRAWINGS

Figure 1:
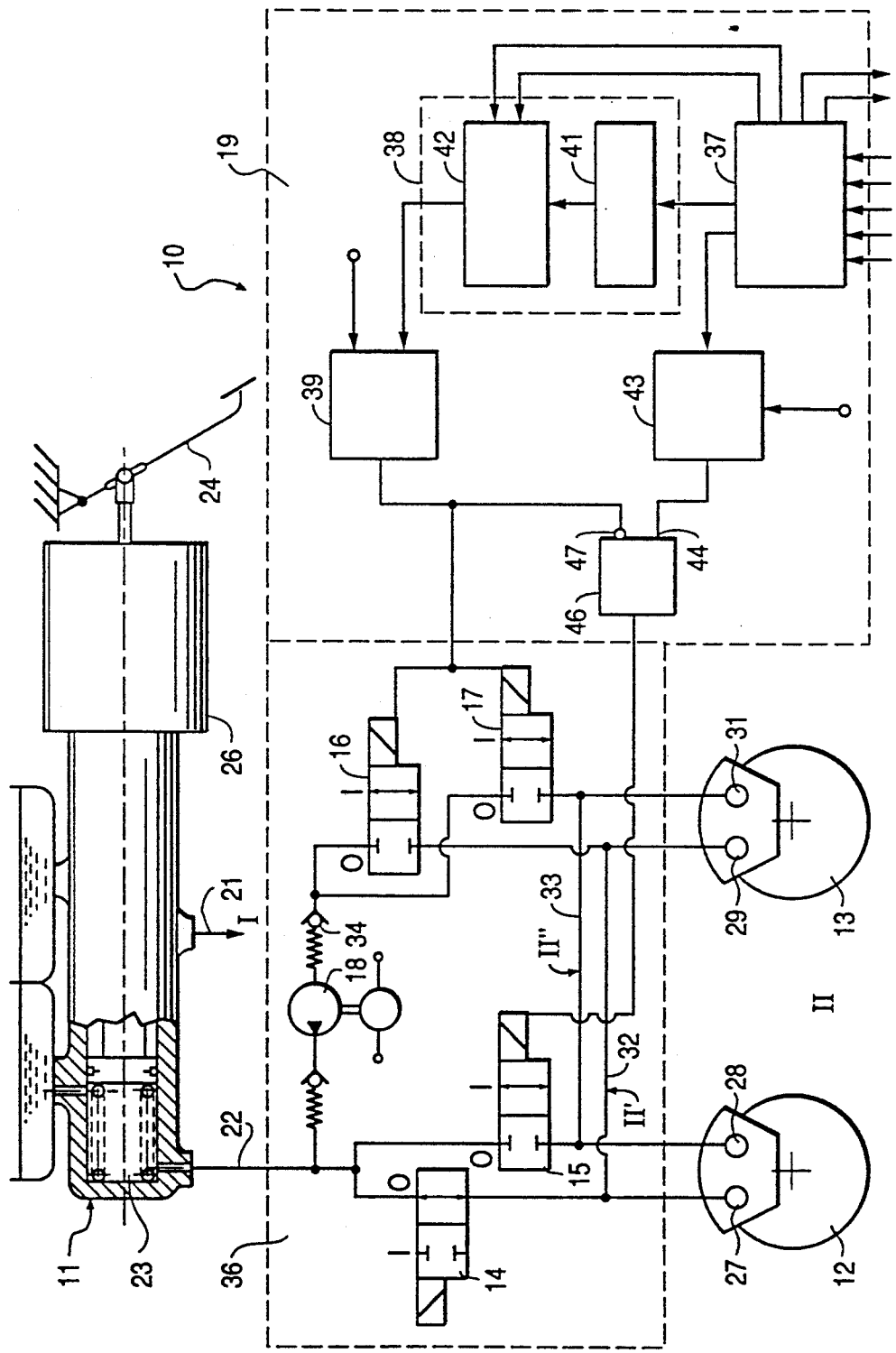
FIG. 1 is a schematic diagram showing a presently preferred embodiment of an anti-lock system according to the present invention.

The anti-lock system illustrated in FIG. 1 is designated generally by the numeral 10 and is intended for a road vehicle allowing extremely high braking, especially a racing vehicle. In the illustration of FIG. 1, the system is represented by a brake unit 11, rear-wheel brakes 12 and 13, electrically actuatable brake-pressure regulating valves 14 to 17 assigned to these brakes, an electrically driven return pump 18 and an electronic control unit designated generally by the numeral 19 for the anti-lock system 10 to generate actuating signals necessary for actuating the above-mentioned electrically actuatable components sequentially and in a combination appropriate for control.

It is a precondition that the brake system of the vehicle be designed as a hydraulic dual-circuit brake system with a front-axle/rear-axle brake-circuit allocation.

The wheel brakes, brake-pressure regulating valves and the functional units of the electronic control unit 19, assigned to the front-axle brake circuit I, are not shown specifically in FIG. 1 for the sake of representational simplicity but are represented in FIG. 1 by a brake-unit pressure outlet 21 provided for brake circuit I.

Furthermore, in the exemplary embodiment chosen for the explanation, it is assumed that the anti-lock system works on the so-called "return-flow principle",
according to which, in brake-pressure pressure reduction phases of the anti-lock control, brake fluid bled from the wheel brakes 12 and 13 is pumped back, by the return pump 18 of the rear-axle brake circuit II, into its main brake line 22. That is, the bled brake fluid is returned into the outlet-pressure space 23 assigned to this brake circuit II and belonging to the brake unit 11 which is assumed to be a tandem master cylinder of a type known per se which can be actuated in the usual way by a brake pedal 24 via a hydraulic or pneumatic brake booster 26.

The wheel brakes 12, 13 of the rear-axle brake circuit II are configured as 4-cylinder, fixed-calliper brakes which each have two pairs of cylinders 27, 28 and 29, 31. A pair of wheel cylinders 27, 28 of one wheel brake 12, namely the left rear wheel, is connected respectively to one of the pairs of cylinders 29, 31 of the other wheel brake 13, namely the right rear wheel, by a brake-line branch 32, 33 to form a "part brake circuit" II' and II'', respectively.

The first part brake circuit II' comprising the two pairs of wheel cylinders 27, 29 of the two rear-wheel brakes 12, 13 is connected to the main brake line 22 of the rear-axle brake circuit II via the brake-pressure regulating valve 14 which is a 2/2-way solenoid valve and of which the basic position 0 is its throughflow position and the energized position I is the blocking position. The second part brake circuit II'' is likewise connected to the main brake line 22 of the rear-axle brake circuit II via the brake-pressure regulating valve 15 which is likewise a 2/2-way solenoid valve and of which the basic position 0 is the blocking position and its energized position I is the throughflow position.

Both in the normal braking mode, that is to say the mode not subjected to the anti-lock control, and in the controlled braking mode, these two brake-pressure regulating valves 14, 15 are used as inlet valves, via which the brake-pressure build-up in the wheel brakes 12, 13 is obtained or brake-pressure rebuild-up phases of the anti-lock control are controlled. The part brake circuits II', II'' are each connected via one of the two further brake-pressure regulating valves 16, 17 to the inlet side of the return pump 18 or its inlet non-return valve 34. The two brake-pressure regulating valves 16, 17 are likewise 2/2-way solenoid valves, of which the basic position 0 is the blocking position and the energized position is the throughflow position. Their function in the anti-lock control mode is to control brake-pressure reduction phases on the rear-wheel brakes 12, 13.

In the embodiment illustrated, the two outlet valves 16, 17 are always actuated jointly. For the anti-lock system 10 which, in terms of the design and switching arrangement explained thus far only with reference to the rear axle and in terms of the actuator of its hydraulic unit designated generally by numeral 36, works with an "in-phase" control on the rear-wheel brakes 12, 13. That is to say, brake-pressure reduction, brake-pressure holding and brake-pressure rebuild-up phases take place in the same direction and simultaneously on the two rear-wheel brakes; it is presupposed that for the front-wheel brakes (not shown) there is an individual wheel control which can also work "in phase opposition", that is to say brake pressure can be reduced on one front-wheel brake, while brake pressure is increased on the other front-wheel brake. The necessary design of the part of the hydraulic unit 36 assigned to the front-wheel brake circuit I can be considered as known per se and therefore does not need any further explanation.

The same can also be presupposed for a processor 37 which is provided within the framework of the electronic control unit 19 and which, from a processing of output signals from wheel-speed sensors assigned to the vehicle wheels, generates signals which are characteristic of the vehicle speed, the vehicle acceleration and deceleration and the brake slip and from the further processing and combination of which the activating signals necessary for the control-related activation of the brake-pressure regulating valves 14, 15, 16 and 17, and of the return pump 18 are obtained.

The further subunits of the electronic control unit 19 of the anti-lock system 10 are explained below in terms of their function, from the knowledge and purpose of which it is directly possible for an average person skilled in the art to produce these subunits by apparatus currently available in electronic circuit technology.

The electronic control unit 19 comprises a computer, designated generally by numeral 38, to which are fed, as inputs, output signals which are generated continuously by the processor 37 and which contain the information on the wheel-circumference speed v, on the brake slip $\lambda_h$ related to a reference speed generated by the processor 37 according to known criteria and algorithms, and on the wheel-circumference deceleration $Z_h$ and acceleration of the wheel or wheels to be controlled individually o or jointly. From an "on-line" processing of these v-, $\lambda$- and Z-inputs, the computer 38 forms a reference quantity $K_h$ according to the relation $$K_h = X_h \cdot Z_h + Y \cdot \lambda_h \quad (1),$$

in which the factor $X_h$ is given by the relation $$X_h \cdot (Z_{maxh} + \Delta Z_o) = 1 \quad (2),$$

in which Zmax designates the maximum braking attainable on a dry road with good grip and related to the vehicle weight G, and $Z_o$ designates a safety value which has a value of around 0.3. The factor Y is determined by the relation $$Y \cdot \lambda_{maxh} = 1 \quad (3),$$

in which $\lambda_{maxh}$ designates the maximum brake slip on the rear axle which still allows a stable dynamic behavior of the vehicle and which has a typical value of around 0.2, $Z_h$ designates the wheel-circumference deceleration of the rear wheel in question and $\lambda_h$ the brake slip.

The reference quantity $K_h$ thus represents a weighted sum of the wheel-circumference deceleration including a safety value and the brake slip. By virtue of the high-level output signal of a first comparator 39 of the electronic control unit 19, which is generated as soon as the reference quantity $K_h$ reaches or exceeds the reference value 1 denotable as the standardized response threshold of the anti-lock control, the outlet valves 16, 17 of the hydraulic unit 36 are moved into their throughflow positions I.

The aforementioned method of control of brake-pressure reduction phases of the anti-lock control is similar to that of known anti-lock systems, in which the reference quantity to be compared with the response threshold is likewise formed as a weighted sum of the wheel deceleration and brake slip.

In contrast to such known anti-lock systems in which the weighting factors have constant values, however, in the ABS 10 of the present invention the weighting factor $X_h$ is formed in dependence on the speed according to the relation:

$$X_h = X_{oh} - b \cdot v \quad (4),$$

in which $X_{oh}$ and b denote positive constants which have typical values around 0.6 and 0.005 respectively.

To illustrate this function of the computer 38, the latter is shown with a stage 41 which generates the weighting factor $X_h$ from the speed input v according to the equation (4) above, and with an output stage 42 which, taking into account the speed-variable weighting factor $X_h$, forms the reference quantity $K_h$ from the slip and deceleration information according to the equation (1).

Furthermore, the electronic control unit comprises a second comparator 43 which, from the comparison of an output signal of the processor 37 representing the vehicle speed $v_F$ with a reference signal corresponding to a speed threshold $v_s$ of, for example, 100 km/h, emits a high-level output signal when the vehicle speed $v_F$ is higher than this speed threshold $v_s$.

The output signal of the speed comparator 43 is fed to a non-negated input 44 of a 2-input AND element 46, of which the second input 47 connected to the output of the first comparator 39 is negated. By virtue of the high-level output signal of this AND element 46, the brake-pressure regulating valve 15 blocking in its basic position and assigned as an inlet valve to the part brake circuit II" is switched into its energized position I.

Thus, above the speed $v_s$, a connection of the second part brake circuit II" to the part brake circuit II', alone ready for operation hitherto and also continuing to be active, of the rear-axle brake circuit II is achieved, and consequently a brake-force distribution increasing the rear-axle brake-force fraction is achieved. This change of the ratio of the installed brake-force distribution does not entail a loss of dynamic stability of the vehicle, since, at the high vehicle speeds, the aerodynamic forces acting on the racing vehicle bring about an increase of the axle loads which is relatively greater on the rear axle than on the front axle.

As soon as the anti-lock system 10 becomes active on the rear axle in the sense of a brake-pressure reduction phase, that is to say the output signal of the first comparator 39 changes to a high signal level, the output signal of the AND element 46 decreases, with the result that the connectable part brake circuit II", because the inlet valve assigned to it falls back into its basic position 0, is once again shut off from the brake-line branch 47 which is assigned to it and extends from the main brake line 22 of the rear-axle brake circuit II and which supplies the second part brake circuit II" of the latter.

In contrast to a conventional anti-lock system the anti-lock system 10 is designed in such a way that, at higher values of the vehicle speed, the pressure-reduction response threshold of the anti-lock control is also reached only at higher values of the wheel-circumference deceleration or decelerations, so that high vehicle decelerations as high as possible can be obtained with the anti-lock system 10 explained thus far, appropriately in combination with a brake system adjustable to different values of a fixed brake-force distribution or else continuously to different values of the brake-force distribution, allowing for the aerodynamic forces active at high driving speeds.

In the embodiment illustrated, this is achieved, in terms of the rear-wheel brakes 12, 13, by a reduction, speed-dependent according to the equation (4), of the weighting factor $X_h$ by which the wheel-circumference deceleration $Z_h$ contributes to the reference quantity $X_h$ which is compared with the reference quantity standardized at the value 1 in the chosen explanatory example.

The same applies as regards the front-wheel brakes to the equations (1') to (4') similar to the equations (1) to (4):

$$K_v = X_v Z_v + Y \cdot \lambda_v \tag{1'}$$

$$X_v = 1/(Z_{maxv} + \Delta Z_o) \tag{2'}$$

$$Y = 1/\lambda_{maxv} \tag{3'}, \text{ and}$$

$$X_v = X_{ov} - b \cdot v \tag{4'}$$

The subunits of the electronic control unit 19 which are necessary in this respect for the front wheels of the vehicle and which are similar in the computer 38 and the comparator 39 are not shown for the sake of simplicity.

The constants $X_{oh}$ and $X_{ov}$ and b critical for forming weighting factors $X_h$ and $X_v$ according to the equations (4) and (4') can be determined by testing, for example, in a wind tunnel by way of a roller-type test stand, or arithmetically by employing in the equations (3) and (3') the maximum brakings $Z_{maxh}$ and $Z_{maxv}$ which are obtainable in view of the aerodynamic forces and which are given for the rear axle by the equation $$Z_{maxh} = Z_{b1h} - \frac{\mu_H \cdot K_{HA} \cdot v^2}{(\mu_H \cdot \chi + \phi) \cdot G} + \frac{K_w \cdot v^2}{G} \tag{5}$$

and for the front axle by the equation $$Z_{maxv} = Z_{blv} - \frac{\mu_v \cdot K_{VA} \cdot v^2}{(\Lambda - \mu_v \cdot \chi - \phi) \cdot G} + \frac{K_w \cdot v^2}{G} \tag{5'}$$

In the equation (5), $Z_{blh}$ designates the locking limit of the rear wheels which is given by the equation $$Z_{blh} = \frac{Z_{blv} = \mu_H \cdot \psi}{\mu_s \cdot \chi + \phi} \tag{6}$$

In the equation (5'), $Z_{blv}$ denotes the locking limit of the front wheels which is given by the equation $$Z_{blv} = \frac{\mu_v (1 - \psi)}{\Lambda - \mu_v \cdot \chi - \phi} \tag{6'}$$

The quantities further indicated in the equation (5), (5'), (6) and (6') are defined as follows in conventional nomenclature:

$\mu_h$ adhesion coefficient on the rear axle
$\mu_v$ adhesion coefficient on the front axle
G vehicle weight in N
$\Psi$ rear-axle load fraction related to the vehicle weight G
$\chi$ height of center of gravity related to the wheel base
$\phi$ rear-axle brake-force fraction related to the vehicle weight G
$K_{VA}$ front-axle lift coefficient
$K_{HA}$ rear-axle lift coefficient, each in $Ns^{-2} \cdot m^{-2}$
$K_w$ coefficient of air resistance in $Ns^{-2} \cdot m^{-2}$, and v speed in $ms^{-1}$ For a racing vehicle with the following data:

| | |
|---|---|
| $\phi$ = 0.4 | $K_{VA}$ = $-1$ |
| $\chi$ = 0.14 | $K_{HA}$ = $-2$ |
| $\Psi$ = 0.6 | $K_w$ = 0.6 |
| G = 10000 N | | and on the assumption that the adhesion coefficients $\mu_v$ and $\mu_h$ on the front axle and on the rear axle have the same value of 1.5 and the safety threshold $Z_o$ has the value of 0.3, an evaluation of the equations (5) and (5') for the weighting factors $X_h$ and $X_v$ gives the values compiled in Table 1 for the speed range of 0 to 70 $ms^{-1}$.

TABLE 1

| v | 0 | 10 | 20 | 30 | 40 | 50 | 60 | 70 |
|---|---|---|---|---|---|---|---|---|
| $X_v$ | 0.544 | 0.531 | 0.496 | 0.447 | 0.392 | 0.339 | 0.291 | 0.249 |
| $X_h$ | 0.563 | 0.546 | 0.501 | 0.440 | 0.376 | 0.317 | 0.266 | 0.223 |

It can be seen from the graphical representation of Table 1 reproduced in FIG. 2 that both the $X_h$ trend curve 48, represented by dashes, and the $X_v$ trend curve 49, represented by dots and dashes, can, for a typical racing vehicle with the data given, be approximated very closely, that is to say sufficiently by the unbroken straight line 51 which satisfies the equation $$X = 0.6 - 0.005 \cdot v \tag{7}$$

as indicated in general form by the equations (4) and (4').

The secondary conditions for this approximation represented by the equation (7) are, on the one hand, that X must always be higher than the higher of the values $X_v$ or $X_h$, that is to say:

$$X \geq \max(X_v, X_h),$$

and, on the other hand, that the area between the curve given by the above-mentioned relation and the straight line(s) given by the equation (7) or the equations (4) and (4') should be a minimum, that is to say:

$$\int_0^{V_{max}} (X - \max(X_v, X_h)) \, dv = \min.$$

The same applies accordingly when the inertial behavior of vehicle wheels is also taken into account in the calculation of the weighting factors $X_v$ and $X_h$, in which case the following relations hold good instead of the equations (4) and (4'):

$$X_h = \frac{1}{(Z_{bln} + \Delta Z_o)\left(1 + \frac{K \times h \cdot v^2}{Z_{blh}}\right)}, \tag{8}$$

with $$K_{xh} = \frac{K_w}{G} - \frac{\mu_H \cdot K_{HA}}{G(\mu_H \cdot \chi + \phi)}$$

and:

$$X_v = \frac{1}{(Z_{blv} + \Delta Z_o)\left(1 + \frac{K_{xv} \cdot V}{Z_{blv}}\right)} \tag{8'}$$

-continued with $$K_{xv} = \frac{K_w}{G} - \frac{\mu_v \cdot K_{va}}{G(1 - \mu_v \cdot \chi - \phi)}$$

An evaluation of these equations (8) and (8') gives, as a function of the speed, the values for $X_v$ and $X_h$ which are compiled in Table 2 below and which, as is immediately evident, differ only slightly from those of Table 1.

TABLE 2

| v | 0 | 10 | 20 | 30 | 40 | 50 | 60 | 70 |
|---|---|---|---|---|---|---|---|---|
| $X_v$ | 0.544 | 0.529 | 0.488 | 0.432 | 0.372 | 0.316 | 0.267 | 0.225 |
| $X_h$ | 0.563 | 0.543 | 0.490 | 0.421 | 0.352 | 0.291 | 0.240 | 0.199 |

For the sake of clarity and simplicity, FIG. 2 does not reproduce trend curves corresponding to the values of Table 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A process for anti-lock control on a high-speed aerodynamically-designed road vehicle in which, at high speeds, a clear increase both of the front-axle load and of the rear-axle load of the vehicle results, provided that $X_v$, $X_h$ and Y are weighting factors, and $\mu_v$ is an adhesion coefficient on a front axle, $\mu_h$ is an adhesion coefficient on a rear-axle, $\chi$ is a rear-axle load fraction, $\Psi$ is a height of center of gravity related to a wheel brake of the vehicle, $\Phi$ is a rear-axle brake-force fraction related to vehicle weight, $K_{VA}$ is a negative lift coefficient on the front axle, $K_{NA}$ is a negative lift coefficient on the rear axle, $K_w$ is a coefficient of air resistance, G is the vehicle weight (N), $\lambda_{maxv}$ is the maximum possible brake slip on the front wheels $\lambda_{maxh}$ is the maximum permissible brake slip on the rear wheels, $\Delta Z_o$ is a safety value of approximately 0.3, $Z_v$ is wheel-circumference deceleration of the front wheels, $Z_h$ is wheel-circumference deceleration of the rear wheels, $\lambda_v$ is a brake slip of the front wheel, $\lambda_h$ is a brake slip of the rear wheel, v is vehicle speed $$Z_{blv} = \frac{\mu_v \cdot (1 - \Psi)}{1 - \mu \cdot X - \phi}, \text{ and}$$

$$Z_{bln} = \frac{\mu_n \cdot \Psi}{\mu_d \cdot X + \phi}$$

comprising the steps of comparing deceleration of front and rear wheels of the vehicle with a threshold value by generating axle-related reference quantities, $K_v$ and $K_h$, of the front and rear axles, respectively, as a sum of weighted amounts of the wheel-circumference decelerations $Z_v$ and $Z_h$, respectively, and the brake slip $\lambda_v$ and $\lambda_h$, respectively, in relation to a reference speed in accordance with the relationship $K_v = X_v \cdot Z_v - Y \cdot \lambda_v$ and $K_h = X_h \cdot Z_h - Y \cdot \lambda_h$, standardizing the weighting factors $X_v$, $X_h$ and Y in such a way that $X_v(Z_{maxv} + \Delta Z_o) = 1$ and $X_h(Z_{maxh} + \Delta Z_o) = 1$, and $Y \cdot \lambda_{maxv} = 1$ and $Y \cdot \lambda_{maxh} = 1$, determining maximum values, $Z_{maxv}$ and $Z_{maxh}$, of the wheel-circumference decelerations of the front and rear wheels, respectively, linked to the highest possible vehicle deceleration taking into account air force on the front and rear axles, according to the relationships $$Z_{maxv} = Z_{blv} - \frac{\mu_v \cdot K_{vA} \cdot v^2}{(A - \mu_v \cdot X - \phi) \cdot G} + \frac{K_v \cdot v^2}{G}$$

$$Z_{maxv} = Z_{blv} - \frac{\mu_f \cdot K_{vA} \cdot v^2}{(A \mu_v \cdot X -) \cdot G} + \frac{K_v \cdot v^2}{G}$$

reducing, as a function of the vehicle speed (v), the weighting factors of the deceleration $Z_v$ and $Z_E$ according to the following $X = X_o - b \cdot v$, under the secondary conditions that $$\int_0^{v_{max}} (X - \max(X_v, X_h)) \, d_v = \min,$$

triggering response of the anti-lock control in a direction of a brake-pressure reduction on a wheel brake of a wheel requiring control when the axle-related reference quantities, $K_v$ and $K_h$, exceed an axle-related threshold value which is compatible with a stable dynamic behavior of the vehicle while ensuring a high value of the wheel deceleration; and modulating the brake pressure to selectively increase and decrease the front-axle brake force and the rear axle brake force to effect controlled braking at high decelerations with the road vehicle at maximum speed.

2. A process according to claim 1, wherein the anti-lock control includes a brake system which is switchable between at least two brake-force distribution values which correspond to a different fixed setting, an electronic control unit with a speed comparator which, when a speed threshold value is exceeded, generates an output signal causing a switch to a brake-force distribution with a higher rear-axle brake-force fraction, and a comparator which compares a reference quantity with a response threshold value and which, as soon as the reference quantity reaches the threshold value and the control responds in a direction of a pressure reduction phase, switches the brake system back to the brake-force distribution linked to the lower rear-axle brake-force fraction.

3. A process according to claim 2, wherein the rear-wheel brakes are 4-cylinder brakes, a pair of cylinders of one wheel brake being combined, respectively, with a pair of cylinders of the other wheel brake to form a part brake circuit of the rear-axle brake circuit, one of these two part brake circuits being shut off from the brake unit below the speed threshold by a valve movable into its open position by the output signal of the speed comparator.

4. A process according to claim 3, wherein a master cylinder with a switchable brake-pressure distribution, switches the brake-force distribution.

* * * * *